United States Patent [19]

Kowalski

[11] 4,096,225

[45] Jun. 20, 1978

[54] METHOD OF MAKING A FASTENER ELEMENT

[75] Inventor: John A. Kowalski, Erie, Pa.

[73] Assignee: Textron, Inc., Providence, R.I.

[21] Appl. No.: 748,343

[22] Filed: Dec. 7, 1976

Related U.S. Application Data

[62] Division of Ser. No. 583,700, Jun. 4, 1975.

[51] Int. Cl.² .................... B29C 17/02; B29D 3/00; B29D 5/00
[52] U.S. Cl. .................... 264/167; 264/214; 264/216; 264/251; 264/254; 264/261; 264/278; 264/295; 264/310; 264/328; 264/339
[58] Field of Search ............ 264/167, 174, 172, 251, 264/254, 261, 271, 275, 285, 339, 294, 328, 320, 321, 279, 295, 278, 310, 216, 214; 425/DIG. 34, 814, 113, 117, 121–123, 129; 24/205.1 R, 205.13 R, 205.13 D

[56] References Cited

U.S. PATENT DOCUMENTS

| | | | |
|---|---|---|---|
| 2,197,968 | 4/1940 | De Mattia | 425/129 |
| 2,282,308 | 5/1942 | Dahlin | 425/121 |
| 2,496,925 | 2/1950 | Winterhalter | 24/205.16 R |
| 2,511,402 | 6/1950 | Firing | 425/121 |
| 3,175,028 | 3/1965 | Waldes et al. | 264/328 |
| 3,179,996 | 4/1965 | Clauss | 24/25.1 R |
| 3,196,196 | 7/1965 | Burbank | 264/328 |
| 3,328,857 | 7/1967 | Burbank | 24/205.13 D |
| 3,414,948 | 12/1968 | Cuckson et al. | 24/205.13 D |
| 3,445,915 | 5/1969 | Cuckson et al. | 264/174 |
| 3,770,862 | 11/1973 | Rojahn | 264/295 |
| 3,880,558 | 4/1975 | Breher et al. | 425/113 |

FOREIGN PATENT DOCUMENTS

| | | | |
|---|---|---|---|
| 1,965,996 | 4/1971 | Germany | 425/814 |
| 2,027,963 | 12/1971 | Germany | 425/814 |
| 446,336 | 4/1936 | United Kingdom. | |
| 871,455 | 6/1961 | United Kingdom | 24/205.13 D |

Primary Examiner—Willard E. Hoag

[57] ABSTRACT

Method of molding plurality of spaced fastener elements onto parallel filaments. A pair of leg portions of each fastening element have, respectively, a projection and an opening, the projection and opening mating to interlock the leg portions. The fastening elements are formed by directing the parallel filaments to a cavity wheel which has mold cavities enclosed by a band, and then injecting plastic material through gate openings in the band into the mold cavities to form a train of fastener elements on the parallel filaments.

6 Claims, 7 Drawing Figures

METHOD OF MAKING A FASTENER ELEMENT

CROSS REFERENCE TO RELATED APPLICATION

This application is a division of copending application Ser. No. 583,700 Filed Jun. 4, 1975.

BACKGROUND OF THE INVENTION

1. Field of the Invention

The invention relates to slide fasteners and to methods and apparatus for manufacturing slide fasteners. The invention particularly relates to slide fasteners employing trains of fastener elements molded on parallel filaments.

2. Description of the Prior Art

The prior art, as exemplified in U.S. Pat. Nos. 2,496,926, 3,328,857, 3,444,948, 3,445,915, 3,487,531 and 3,770,862 and Great Britain Patent 446,336 contains many types of slide fasteners including fasteners with trains of fastener elements molded on parallel filaments as well as methods and apparatus for manufacturing the same. Pairs of leg portions of the fastener elements extending in opposite directions from head portions are folded together to form base portions which are sewn or woven to the edge of a carrier tape.

Previous fastener elements in trains molded on parallel filaments had leg portions with flat facing surfaces; such flat facing surfaces allowing relative lateral movement therebetween which can result in distortion of the fastener elements and degradation of their fastening ability.

In forming stringers wherein the filaments of the trains of fastener elements are used to at least partially support or hold the fastener elements on the edge of the carrier tapes, the filaments are often torn from the fastener elements due to the shallow depth to which the filaments are embedded in the fastening element; for the same reason, the fastener elements of such prior art stringers can not withstand large lateral forces, the fastener elements being readily pulled from the filaments and stringers.

In prior art apparatus for producing molded trains of fastener elements, the friction between plastic injection shoes and cavity wheels results in wear of the cavity wheels requiring them to be periodically replaced.

Head portions of molded fastener element trains must have tapered projections with underside surfaces sloping upward to allow proper interlocking and release between opposing fastener element trains. Due to the resulting flat underside surfaces on the head portions formed by the sliding of prior art injection shoes over the cavities or by linear shaving, it was previously necessary to form the upward-sloping underside surfaces on the head projections during the folding of the leg portions; such forming requiring additional steps or particular control of the fastener elements.

SUMMARY OF THE INVENTION

The invention is summarized in that a method of forming a continuous train of fastener elements includes the forming of a train of transverse elongated fastener elements having end portions respectively molded around a pair of spaced continuous parallel filaments wherein an opening is formed in one surface of each elongated fastener element at one end thereof adjacent to a respective one of the filaments, and a projection is formed on the same one surface at the other end portion of each elongated fastener element adjacent the other filament. The train of elongated fastener elements is folded longitudinally to bring the ends of the one surface of each fastener element together and to insert each projection into the corresponding opening to secure the end portions of the fastening elements together and to reinforce the union of filaments with the fastening elements.

Additionally, a fastener element train is manufactured in accordance with the method and apparatus of the invention by engaging a band with a peripheral portion of a cavity wheel to close mold cavities through which supporting filaments extend. Thermoplastic is injected into the mold cavities through gate openings formed in the band.

An object of the invention is to produce a fastener element train which is less expensive, more reliable and easier to assemble then has previously been possible.

Another object of the invention is to design a fastener element train of the type having fastener elements molded on a pair of filaments which can be secured to the edge of a carrier tape and withstand greater crosswise force than has heretofore been possible in such type of fastener train.

It is also an object of the invention to provide a method and apparatus for forming continuous fastener element train wherein the necessity of shaving backing strips or flash from the train is eliminated.

A further object of the invention is to construct an apparatus for manufacturing continuous fastener element trains wherein continuous traveling cavities are closed over supporting filaments to provide molding cavities for forming elements of a continuous fastener train on the filaments.

An advantage of the invention is that projections and openings on opposite leg portions of the fastener elements will interlock when folded, thus providing greater stability and control of the dimensions of the fastener elements as well as increasing the strength of attachment of a filament embedded in each leg portions.

Another advantage of the invention is that the utilization of a mold cavity formed by separate portions allows the design of a variety of different shape fastener elements that have heretofore been previously unavailable.

Other objects and advantages of the invention will be apparent from the following description of the preferred embodiment taken in conjunction with the drawings.

DESCRIPTION OF THE PREFERRED EMBODIMENT

Figure 1:
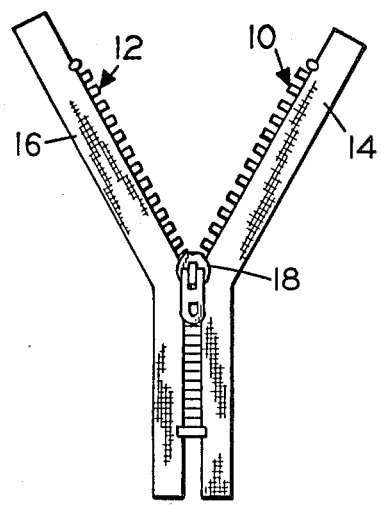
FIG. 1 is a plan view of a slide fastener constructed in accordance with the invention.

As illustrated in FIG. 1, a slide fastener manufactured in accordance with the invention has opposing trains of slide fastener elements, indicated generally at 10 and 12, attached to edges of respective carrier tapes 14 and 16 to form respective stringers. A slider 18 is assembled on the trains 10 and 12 for opening and closing the fastener element trains 10 and 12. The fastener element trains 10 and 12 are substantially identical except that one is turned around or turned over with respect to the other.

Figure 3:
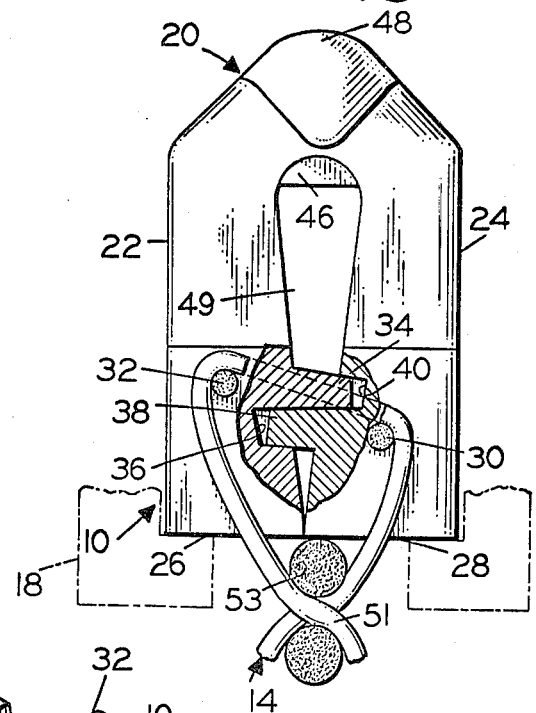
FIG. 3 is a detailed side view in cross section of a portion of the fastener of FIG. 1.
Figure 2:
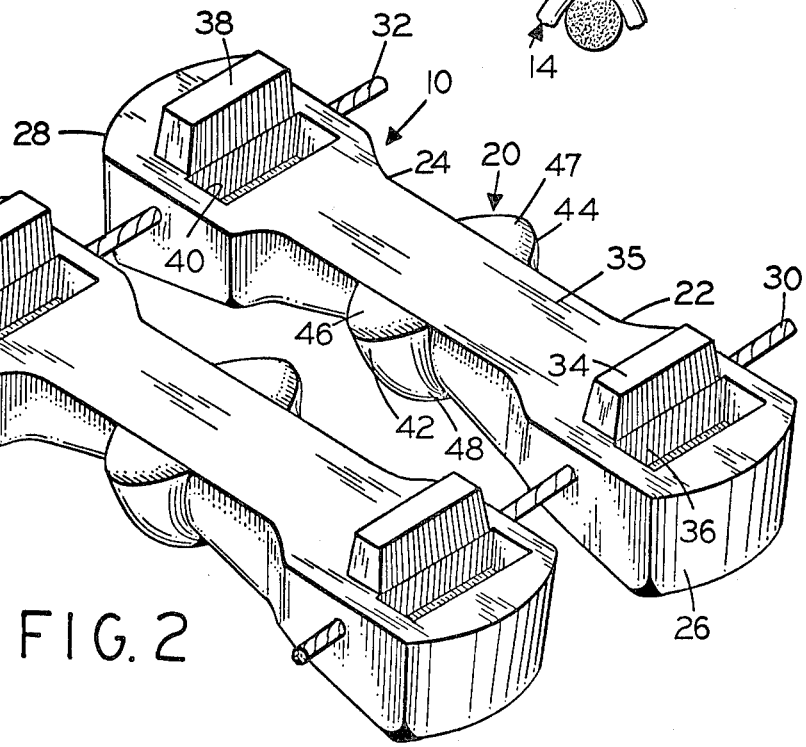
FIG. 2 is a perspective view of a broken away portion of a fastener element train utilized in the fastener of FIG. 1.

The fastener element train 10, as shown in an intermediate step of manufacture in FIG. 2, includes a plurality of elongated fastener elements each having a central head portion indicated generally at 20, leg portions 22 and 24 extending in opposite directions from the head portion 20. The leg portions 22 and 24 terminate in respective end portions 26 and 28 which are molded around respective supporting filaments or threads 30 and 32 running perpendicular to the elongated fastener elements. Each of the end portions 26 has a slightly tapered (about two to five degrees) projection or gate stub 34 extending upward from a generally flat surface 35 formed parallel to the filaments 30 and 32. The projections 34 are inclined away from the head portion 20 at about eight to twelve degrees. A slightly tapered opening 36 is formed in each end portion 26 contiguous to the projection 34 and is also inclined at the bottom toward the head portion 20 at about eight to twelve degrees. Similarly each of the end portions 28 has a projection or gate stub 38 and an opening 40 contiguous the projection 38. The projection 38 is also inclined away from the head portion 20 while the bottom of the opening 40 is inclined toward the head portion 20. As shown in FIG. 3, the projections 34 and 38 and the openings 36 and 40 having mating dimensions and are positioned such that the projection 34 is snugly inserted in the opening 40 and the projection 38 is snugly inserted in the opening 36 when the leg portions 22 and 24 are bent or folded to bring the end portions 26 and 28 into engagement.

The filaments 30 and 32 are generally centered within the respective end portions 26 and 28 adjacent the respective projections 34 and 38 and the respective openings 36 and 40. The filaments 30 and 32 are selected for their flexibility and their strength in being capable of securely supporting the fastener elements.

The head portions 20 each include tapered scoops or extensions 42 and 44 which extend forward and backward from the central portion of the fastener elements. As shown in FIGS. 2 and 3, the under surfaces 46 and 47 of the respective extensions 42 and 44 are formed at an oblique angle with the surface 35 such that the surfaces 46 and 47 extend upward as shown in FIG. 3 to allow proper engagement and disengagement of the fastener elements. A reinforcing ridge 48 extends over the top of head portion 20 for forming a rounded top and aiding in preventing bending of the under side of the head portion 20 to maintain a proper sized eye 49 for receiving the extensions on fastening elements of the opposing train 12.

The fastener element train 10 is secured to the edge of the carrier tape 14 by securing the filaments 30 and 32 to the edge of the tape 14 in any suitable manner similar to the manner that other types of continuous fastener element trains are secured to the edges of tapes. One such manner is illustrated in FIG. 3 by passing weft threads 51 of the tape 14 around the filaments 30 and 32 to secure the filaments 30 and 32 and thus the fastener element train to the edge of the tape 14.

The projections 34 and 38 substantially increase the strength of the end portions 26 and 28 and thus enhance the securing of the filaments 30 and 32 therein. When the projections 34 and 38 are interlocked with the openings 40 and 36 as shown in FIG. 2, the interlocking projections and openings join the opposite leg portions 22 and 24 thus reinforcing the strength of attachment of the filaments adjacent the openings and projections (i.e. crosswise forces tend to more tightly engage the leg portions 22 and 24 which reinforces the molded material of each other leg portion between the filaments 30 and 32 and the inside surface of the leg portions 22 and 24). Interlocking the leg portions 20 and 24 also prevents relative lateral movement between the leg portions which results in substantially more stable and improved fastener elements. The inclination of the projections 34 and 38 and the openings 36 and 40 overcomes the problem of mating the projections and openings when the inside surfaces of the leg portions 22 and 24 are inclined apart.

Figure 4:
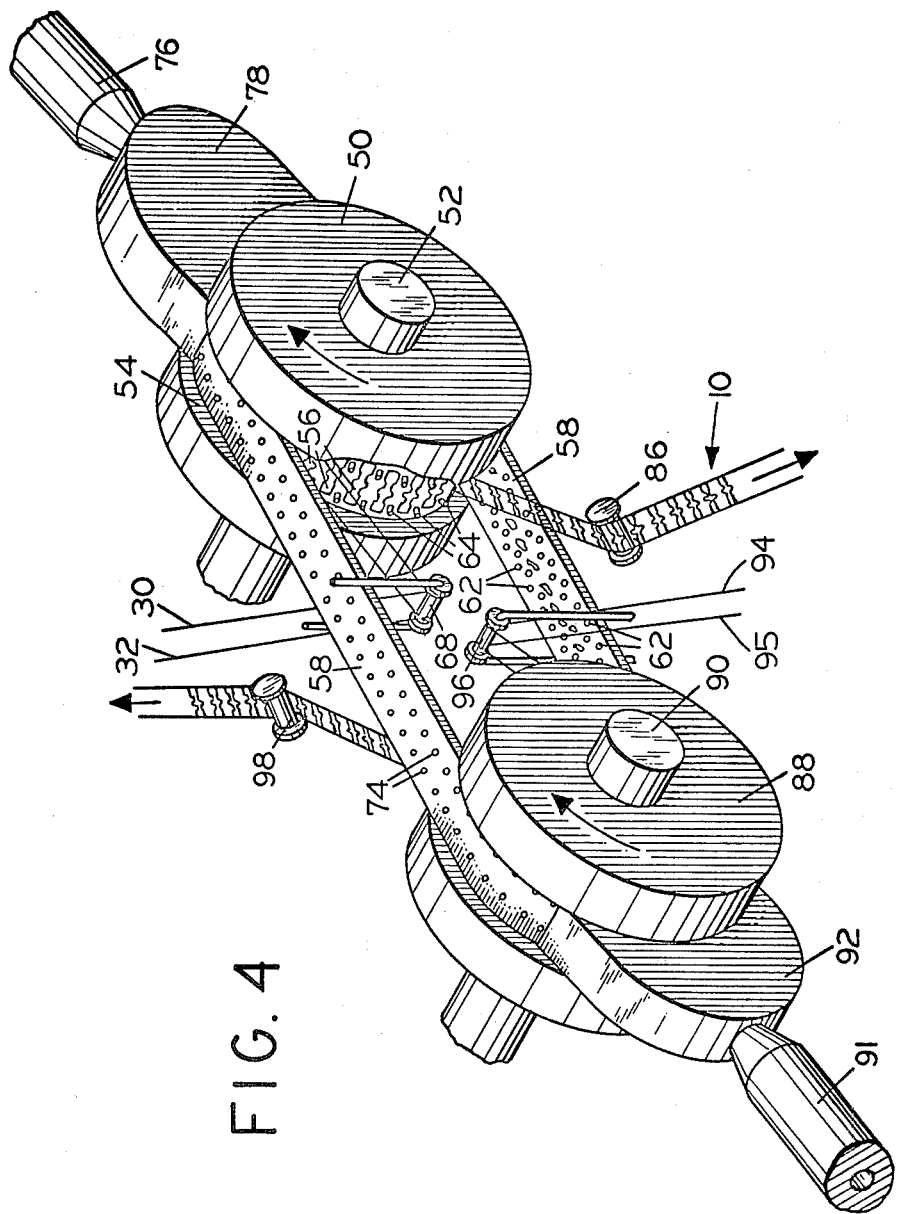
FIG. 4 is a perspective view of an apparatus for forming the continuous fastener element train of FIG. 2.

An apparatus for forming trains of fastener elements, as shown in FIG. 4, includes a cavity wheel 50 mounted on a shaft 52 which is driven by suitable means (not shown). The cavity wheel 50 has a guide slot 54 formed around the outer periphery thereof and within the bottom of which are formed a plurality of mold cavities 56. A steel band or belt 58 is guided within the slot 54 and engages the bottom of the slot 54 from a first angular position to a second angular position of the cavity wheel 50 to close the mold cavities 56, for example clockwise from the top to the bottom of the cavity wheel 50. The mold cavities 56 are exposed by disengagement of the band 58 outside of the arc between the first and second angular positions. The steel band 58 has a plurality of locating holes 62 for mating with locating pins 64 mounted within the slot 54 on the cavity wheel 50 for aligning the band 58 with the cavities 56.

The filaments 30 and 32 are fed over a pulley 68 and into grooves 70 (FIG. 7) formed in the bottom of the slot 54 between adjacent cavities 56. The grooves 70 are aligned in respective annular paths through the bottom of the slot 54. Projections 72 formed on the band 58 extend down into the grooves 70 to hold the filaments (only 30 shown in FIG. 7) against the bottom of the grooves 70 and to close the openings of the grooves into the cavities 56. If necessary to provide vents from the cavities 56, it can be accomplished by providing decreased thickness of the band 54, grooves, or decreased size of the projections 72 to allow venting through adjacent cavities.

Figure 5:
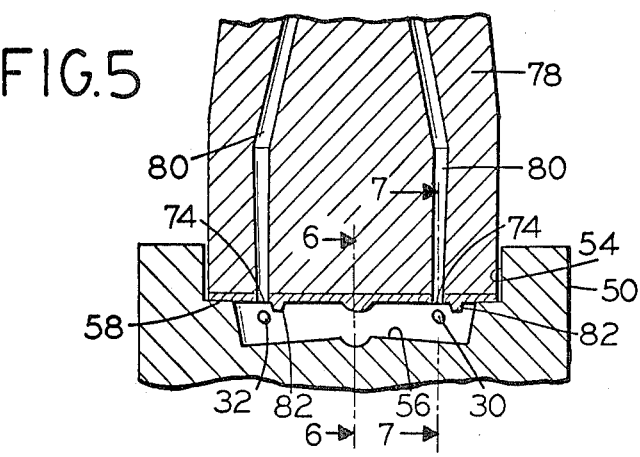
FIG. 5 is a detailed side cross section view of a cavity wheel, band and pressure shoe of the apparatus of FIG. 4.
Figure 6:
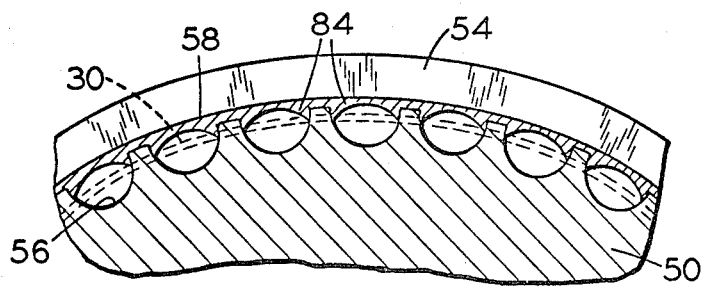
FIG. 6 is a cross section view taken along line 6-6 of FIG. 5.
Figure 7:
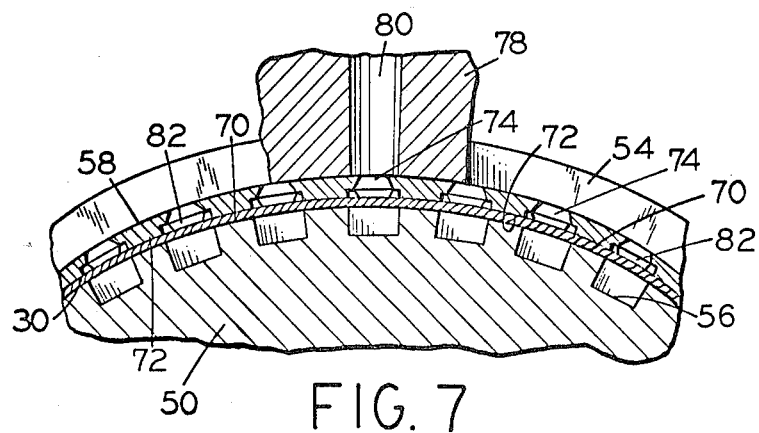
FIG. 7 is a cross section taken along line 7-7 of FIG. 5.

As shown in FIGS. 4, 5 and 7, the band 58 has gate openings 74 formed therethrough in alignment with each of the cavities. 56. A thermoplastic injection apparatus 76 has a shoe 78 which is biased against the band 58 for sliding thereon. Passageways 80 in the shoe 78 are aligned so as to passingly communicate with the gate openings 74 to inject pressurized molten thermoplastic material into the cavities 56. The gates 74 are shaped so as to form the projections or gate stubs 34 and 38 (FIG. 2.). Cores 82 projecting from the band 58 extend into the cavities 56 contiguous the gate openings to form the openings 36 and 40 of the fastener elements. As shown in FIG. 6, suitably shaped projections 84 extend into the central part of the cavities 56 for forming the upward extending surfaces 46 and 47 on the underside of the head portion 20 of the fastener elements.

Referring back to FIG. 4, a pulley 86 is provided for directing the fastener element train from the cavity wheel 50 to a suitable take up device or further processing apparatus (not shown).

Conveniently, the apparatus has a second cavity wheel 88 mounted on a shaft 90 and a injection apparatus 91 having a shoe 92 substantially similar to the cavity wheel 50, the shaft 52, the injection apparatus 76, and the shoe 78, respectively. Support filaments 94 and 95 similar to filaments 30 and 32 are directed by a pulley 96 to the cavity wheel 89. Molded fastener element train is removed from the cavity wheel 89 by passing over the pulley 98. The filaments 94 and 95 are fed from a side opposite to the filaments 30 and 32, and the pulley 98 directs fastener element train to a side opposite to the side the pulley 86 directs the train 10.

In operation of the apparatus of FIG. 4, the cavity wheel 50 rotates and pulls supporting filaments 30 and 32 over pulley 68 into the peripheral portion containing the cavities 56. The steel band 58 is moved along with the wheel 50 by engaging the wheel 50 over the filaments 30 and 32 from the top of the wheel 50 clockwise to the bottom of the wheel 50 to close the cavities 56. The injection shoe 78 slidingly engages the band 58 and forces molten thermoplastic material through the gate openings 74 of the band 58 into the cavities 56. Subsequently after the band 58 disengages the wheel 50 at the bottom of the wheel 50, molded fastener elements in a train 10 linked by the filaments 30 and 32 are removed from the cavities 56 of the wheel 50.

Referring to FIGS. 5, 6 and 7, the filaments 30 and 32 enter into the grooves 70 formed in the bottom of the slot 54 in the wheel 50. The projections 72 on the band 58 ensure that the filaments 30 and 32 are retained within the bottom of the groove 70. By utilizing the steel band 58 with the projections 72, it is possible to have the filaments 30 and 32 positioned within the cavities 56 to any depth therein to allow the filaments to be embedded centrally in the end portions 26 and 28, FIG. 2, of the fastener elements; thus the filaments 30 and 32 are more securely held in the fastener elements and have substantially less tendency to pull out when subjected to force than prior art filaments supporting molded fastener elements.

Additionally the band 58 closes the cavities 56 producing fastener elements which have substantially no flash. As the openings of the passageways 80 pass the gate openings 74, pressurized thermoplastic is injected into the cavities 56 and the gate openings 74. The tops of gate openings 74 are wiped by the shoe 78 to leave the gate stubs 34 and 38. Any flash produced on the outside of the band 48 is readily removed when the band 58 disengages the wheel 50 and the gate stubs 34 and 38 are broken therefrom. Thus the prior art requirement for shaving a backing or removing flash is eliminated. Also it is noted that the force of the injection shoe 78 on the band 58 enhances the closing of the band 58 over the cavities 56.

By having the cores 82 and the projections 84 formed on the steel band 58 with the gate openings 74 formed in the band 58; the openings 36 and 40, the projections 34 and 38 and the obliquely extending underside surfaces 46 and 47 of the head extensions or scoops are formed in a single step of molding the fastener elements. Thus the projections 34 and 38 and the openings 36 and 40 do not have to be formed in an additional step or steps, and the prior art necessity of forming the surfaces 46 and 47 in a separate step after the molding operation have been eliminated.

Also the steel band 58 may be undercut; i.e. formed with cavity portions mating the cavities 56, to produce designs for fastener elements which are not available in the prior art.

Additionally the employment of the band 58 has further advantages in the wear of the cavity wheel 50 produced by engagement of a injection shoe against the cavity wheel is eliminated. Any wear is produced on the outside of the band 58 which does not effect the cavities 56 and formation of the fastener elements. The dimension of extension of the projections 34 and 38 is substantially less critical than the problems created by wear on the prior art mold cavities.

Since many modifications, variations, and changes in detail may be made in the presently described embodiment, it is intended that all matter shown in the foregoing description and accompanying drawings be interpreted as illustrative and not in a limiting sense.

What is claimed is:

1. A method of forming a continuous train of fastener elements comprising the steps of
    forming a train of transverse elongated fastener elements having end portions of each elongated fastener element molded around respective filaments of a pair of spaced continuous parallel filaments,
    said forming including the formation of an opening in one surface of each elongated fastener element at one end portion thereof adjacent to a respective one of the filaments,
    said forming also including the formation of a projection on the same one surface at the other end portion of each elongated fastener element adjacent the other filament, and
    folding the train of elongated fastener elements longitudinally to bring ends of the one surface of each fastener element together and to insert each projection into the corresponding opening to secure the end portions of the fastening elements together and to reinforce the union of the filaments with the fastening elements.

2. A method as claimed in claim 1 wherein said forming includes the formation of a projection on the one end portion and a mating opening on the other end porton so that there are an opening and a projection contiguous each other on each end portion of each fastener element, and said folding including the mating of the openings and projections of the respective end portions of each fastener element.

3. A method as claimed in claim 1 wherein said forming step includes
    direction the pair of continuous filaments to grooves between cavities of a rotating cavity wheel,
    engaging the cavity wheel with a band to enclose the cavities in the cavity wheel and to hold the pair of continuous filaments extending through the cavities,
    injecting thermoplastic into the cavities to form fastener elements in the train on the pair of continuous filaments,
    disengaging the band from the cavity wheel, and
    removing the train of fastener elements from the cavity wheel.

4. A method as claimed in claim 3 wherein
    said projection is formed in a gate passage extending through the band into the respective cavity.

5. A method as claimed in claim 3 including forming in each of the cavities a head portion having interlocking extensions which have surfaces extending obliquely from an underside surface portion thereof.

6. A method as claimed in claim 3 wherein the pair of filaments are held in the bottom of the grooves by projections on the band engaging the pair of filaments so as to hold the pair of filaments extending centrally through the cavities.

* * * * *